April 10, 1945.　　　F. W. SCHARF　　　2,373,345
ELECTRIC IRON
Filed May 5, 1939　　　5 Sheets-Sheet 1

INVENTOR
FRANK W. SCHARF
BY
Roy M. Eilers
ATTORNEYS

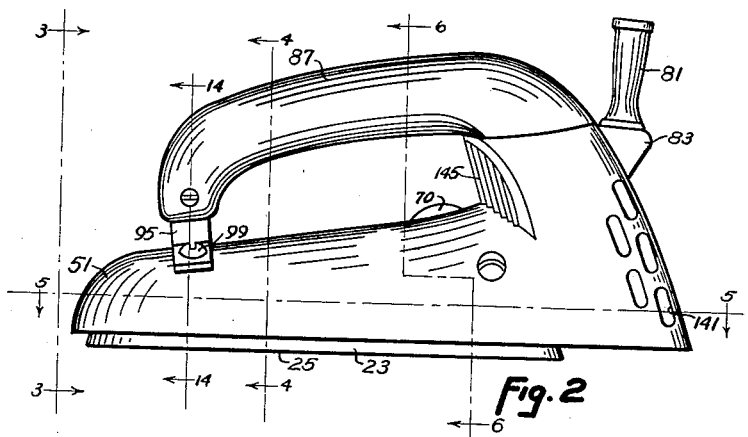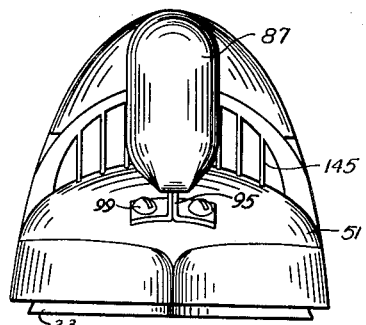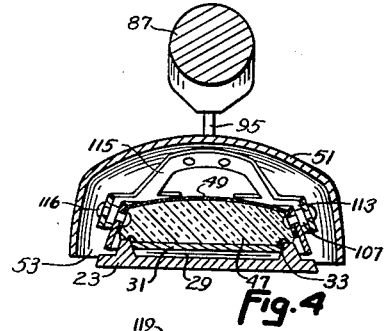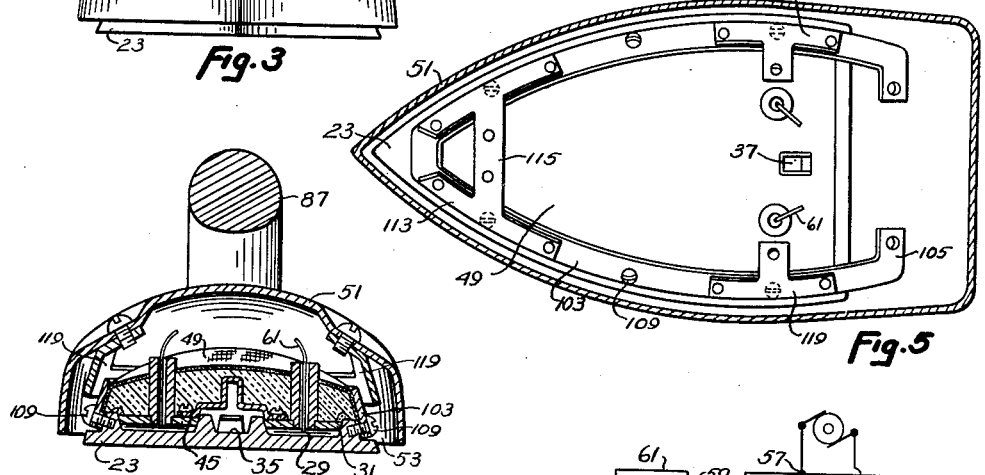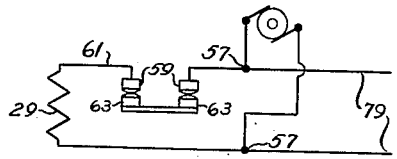

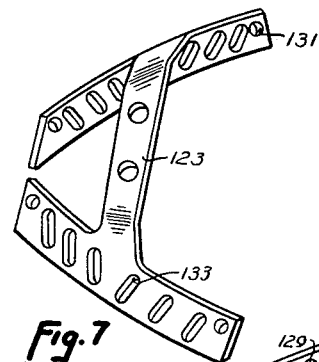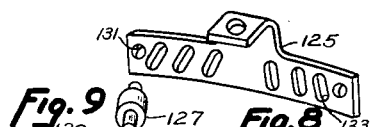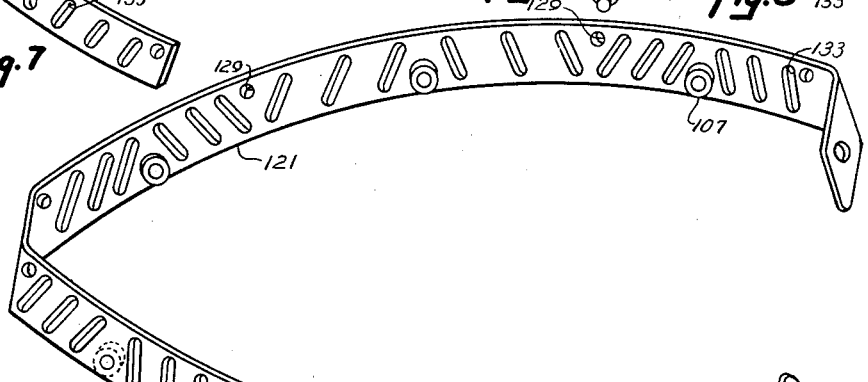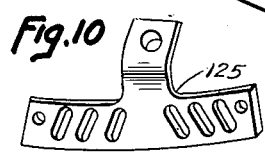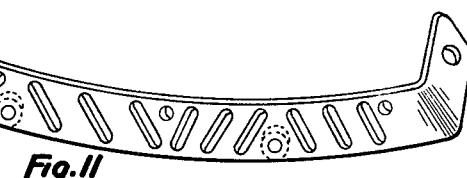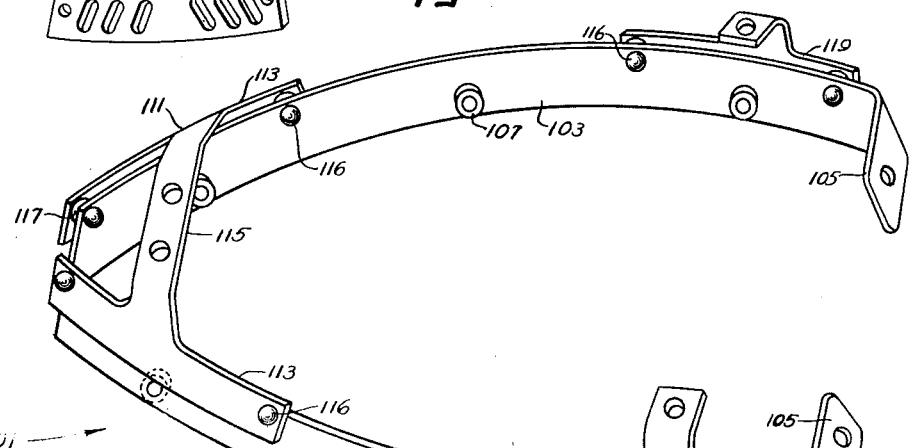

April 10, 1945. F. W. SCHARF 2,373,345
ELECTRIC IRON
Filed May 5, 1939 5 Sheets-Sheet 4

INVENTOR
FRANK W. SCHARF
BY
Roy M. Eilers
ATTORNEYS

April 10, 1945.  F. W. SCHARF  2,373,345
ELECTRIC IRON
Filed May 5, 1939  5 Sheets-Sheet 5

INVENTOR
FRANK W. SCHARF
BY
Roy M. Eilers
ATTORNEYS

Patented Apr. 10, 1945

2,373,345

UNITED STATES PATENT OFFICE 2,373,345

ELECTRIC IRON

Frank W. Scharf, Elgin, Ill., assignor to McGraw Electric Company, Elgin, Ill., a corporation of Delaware Application May 5, 1939, Serial No. 272,031

36 Claims. (Cl. 38—89)

My invention relates to electric irons.

It is an object of my invention to provide an improved electric iron.

While electric irons have been the subject of numerous improvements, the outer housing or cover, the handle, the regulating knobs, and various other parts still become exceedingly hot and the use of the iron not only becomes uncomfortable and disagreeable but the operator is in constant danger of being burned by contact with the housing. These parts reach even higher temperatures after the iron has been set at rest for a while, since during this period heat is not taken from the sole plate but is instead conducted to these parts. It is an object of my invention to provide an iron which will operate with the desired sole plate temperature and yet have a housing temperature well below that which will cause a burn, and whose handle and other parts are maintained at relatively cool temperatures.

The iron which I provide may in addition include means to subject the hand or fingers of an operator as well as the handle of the iron, to a stream of cooling air.

With the majority of the present types of irons, it is extremely difficult to hold a garment being ironed without being burned by the side of the sole plate or the side of the housing. I show means to prevent such accidental burning including a housing extending down in front of and spaced from the sole plate and means to keep the housing below a dangerous temperature.

The housing of the iron provided by my invention is cool enough and may be designed to permit of resting the iron on its side with only the side of the housing and the handle resting on the supporting surface.

I also show means for supporting the housing of the iron by a relatively strong light-weight resilient skeleton structure effective to reduce the amount of heat conducted to the housing.

The iron provided by my invention may include means to move a stream of cooling air both along the upper side and under side of the housing to provide a comfort zone for the hand of the operator as well as to cool the iron housing.

I also provide a housing for an electric iron having an outer surface of a character to increase the heat radiation therefrom and consequently lower the operating temperature of the housing.

Reference is here made to my United States Patent No. 2,186,930, for improvements in Electrically heated pressing irons, issued January 9, 1940. In that patent I have shown and described an electric iron structure in which a motor-driven fan is positioned and arranged to move a stream of cooling air between the iron housing and a heat-insulating means located over the heated body of the iron. The general design of the iron disclosed in that patent is such as to conduct a very large percentage of the heat generated by the electric heating element to the sole plate, reduce the amount of heat flowing upward to the housing, and to reduce still further the housing temperature by moving a stream of air under the housing.

Both the present application and this earlier patent provide electric irons having a housing or cover maintained at a temperature well below that which will cause a burn.

Further objects and advantages of my invention will appear from the following detailed description and accompanying drawings in which I show and describe only several of the many possible embodiments of my invention.

In the drawings:

Fig. 2 is a side elevation in reduced scale of an iron embodying my invention.

Fig. 3 is a front elevation of the iron shown in Fig. 2.

Fig. 4 is a vertical sectional view taken along line 4—4 of Fig. 2.

Fig. 5 is a horizontal section taken along line 5—5 of Fig. 2.

Fig. 6 is a vertical section taken along line 6—6 of Fig. 2.

Fig. 7 is a view in perspective of a part of one form of housing supporting means.

Fig. 8 is a view in perspective of another part of the housing supporting means.

Fig. 9 is a perspective view of a spacer used in the housing supporting structure.

Fig. 10 is a perspective view of another part of the housing supporting means.

Fig. 11 is a perspective view of a V-shaped supporting frame.

Fig. 12 is a perspective view of an assembled housing supporting means which includes parts similar to those shown in Figs. 7-11 inclusive.

Fig. 15 is a schematic diagram of the electrical connections which I may use in my improved iron.

Figure 1:
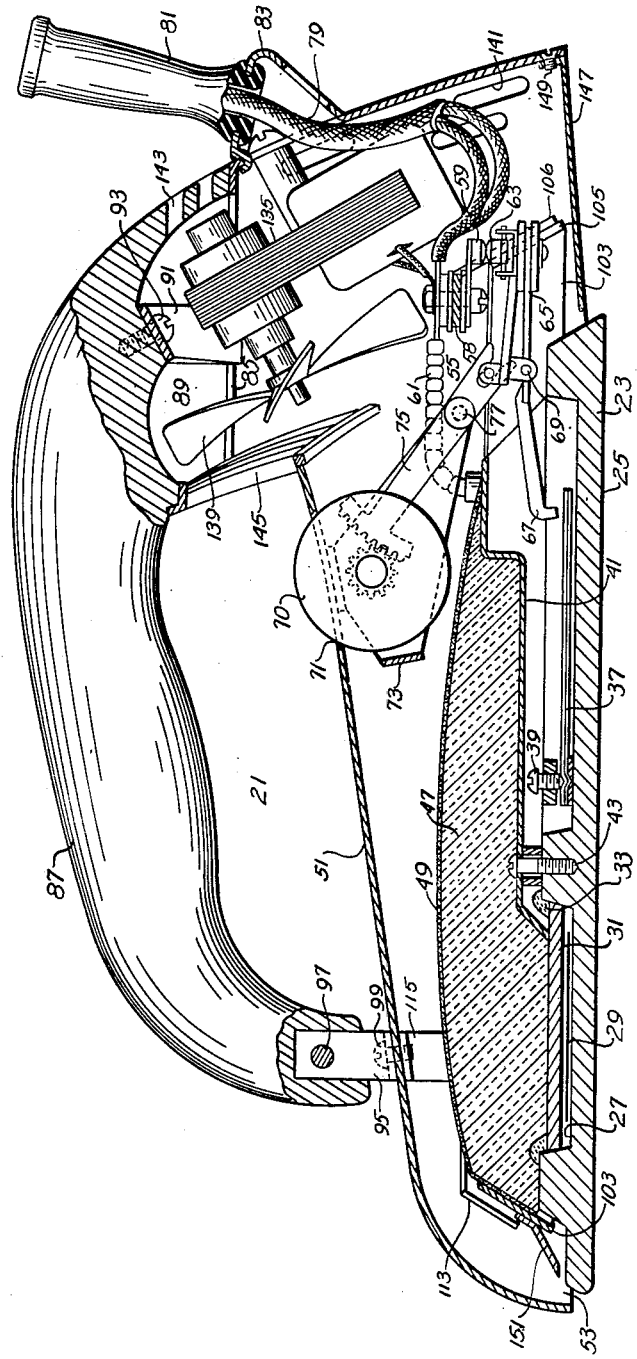
Fig. 1 is a view, mainly in vertical longitudinal section, of an electric iron embodying my invention.

Referring now to the drawings, 21 is an assembled electric iron which includes a sole plate 23 having an ironing surface 25. This sole plate may be of any suitable and desired kind and for purposes of illustration only, I have shown it as having the usual substantially triangular contour and as having a recess 27 in its upper surface, a suitably insulated and protected heating element 29 being positioned in this recess. While no details of construction of this electric heating element are shown as heating elements for electric irons are well known in the art, I prefer a thin planar type as for instance, those employing an upper and lower thin plate of electric insulation such as mica, between which a heating resistor may be positioned. 31 is a clamping or cover plate which may be secured by any suitable means in its proper operative position to tightly clamp the heating element against the sole plate. For purposes of illustration, I have shown the use of a welding seam 33 which may be sectional or continuous, as a means for securing the clamping plate. Various other means may, of course, be used to secure the clamping or cover plate in position.

35 is a central longitudinal well or recess in the heated body in which a bimetallic strip 37 may have one end tightly clamped against the upper surface of the sole plate 23 as by screw 39. The bimetallic strip 37 is arranged so that its free end will move upwardly on being heated to control a main switch to be hereinafter described. A protecting cover 41 of thin sheet metal may be positioned above the well 35, and may be held in place by a screw 43 extending into a boss on the upper surface of the sole plate and by rear screws 45 (see Fig. 6) extending into the clamping or cover plate 31. 47 is a heat insulating means which may be positioned above the clamping plate 31 and the protecting cover 41. This heat-insulating means is indicated as a mass of mineral wool in the drawings and this I have found to serve satisfactorily. I do not desire to be limited thereto, however, as any other heat flow reducing means effective for the same purpose may be used. Thus, bulk insulating materials, solid insulating materials, a plurality of heat-reflecting plates, thin metal foil or a vacuum chamber would all operate quite satisfactorily. The insulation reduces the heat flow upward from the "heated body" or parts heated by electric heating means and cooperates with other elements yet to be described to produce the desired results.

A top holding or retaining means 49 may be used to hold the bulk insulating material in place. I have found a small mesh screen of stainless steel to be effective since stainless steel has itself a high thermal reluctance, although other holding means may, of course, be used.

51 is the housing or outer cover of the iron and may be formed of any suitable material or thin sheet metal as for instance, stainless steel which, because of its inherent high thermal reluctance, will aid in the reduction of heat conduction. As shown the cover is spaced from the upper surface of the heat-insulating means 47. In the iron shown the contour of the lower portion of the housing is complementary to the contour of the heated body.

As will be noted by reference to the several figures of the drawings, the bottom edge of housing 51 extends down in front of the sides of the sole plate and is spaced therefrom to form an air passage or slot 53 therebetween. The rear portion of the housing extends to the rear of the heated body and upwardly therefrom to provide space for an air-moving device which will be later described.

A terminal assembly 55 (see Fig. 1) may be supported within the overhanging rear end portion of the housing 51 and may include a pair of electric terminals 57 supported on a bar 58. Fixed switch contacts 59 are also supported by bar 58. Lead 61 connects the heating element 29 to the terminal assembly 55. Movable contacts 63 are shown mounted on supporting means 65 and suitably insulated therefrom. These movable contacts cooperate with fixed contacts 59 to control energization of the heating element. A schematic diagram of these electrical connections is shown in Fig. 15. The contacts are operated by the bimetallic element 37 through lever arm 67 pivotally mounted on a pin 69.

Means for varying the temperature at which the bimetal operates the switch contacts may include a wheel 70 projecting through an opening 71 in the top portion of the housing and supported by a bracket 73. The wheel actuates adjusting lever 75 pivotally mounted at 77 to vary the effect which movement of the bimetal 37 has on lever 67. In Fig. 1, I have shown the bimetal in unwarped position while in Fig. 16 in another embodiment of my invention, I have shown the bimetal in warped position and the switch contacts in the resultant open position. The adjusting wheel 70 and lever 75 are also shown in different positions in these figures in order to illustrate the operation of the mechanism. I have shown for purposes of illustration a specific form of terminal, switch, thermostat, and adjusting means, but it is to be understood that they form no part of my invention and that any other suitable types may be used.

79 is an electric cord equipped with a flexible protector or sleeve 81 held in position on the housing 51 by a bracket 83 which may be formed integral with the housing or attached thereto in any suitable manner. The individual conductors of the cord 79 are connected with terminals 57 as shown in Fig. 1 and the schematic diagram Fig. 15.

The housing 51 may have an open-top portion 85 closed by a handle 87 of any suitable character which may be provided with a recess 89 in the lower rear portion to cooperate with the upwardly extending portion of the rear of the housing to form a large chamber.

The handle may be held in its proper position against the rear open-top portion of the housing by a resilient bar 91 which has its mid-portion secured to the handle by screw 93. The front of the handle may be secured to the housing 51 by two complementary bars 95 of substantially an L-shape, having their upper portions extending into the forward part of the handle and held by a screw 97. The lower portions of members 95 may be secured against the top of the housing 51 by screws 99.

One form of structure for supporting the housing from the sole plate is shown in Fig. 12, where 101 is the assembled structure, 103 a strip or band substantially V-shaped in contour to conform to the shape of the heated body. The member 103 may be provided with rear end portions 105. A cross bar 106 (see Fig. 1) may be secured to these rear end portions to support the terminal assembly support 58. The band 103 may have spacers 107 secured thereto. These spacers may be hollow and may have screws 109 (see Figs. 5 and 6) extending therethrough into the sloping side of the sole plate 23 to secure the structure to the sole plate. A front supporting member 111 which may be formed substantially as shown with two horizontally extending portions 113 and an upraised cross-connecting portion 115 may be mounted on the two side portions of the band 103 by a suitable means such as rivets 116, spacers 117 being provided between the members 113 and band 103. T-shaped supporting members 119 may be secured as shown at the rear of the band 103 in substantially the same manner as member 111. In the embodiment of the invention which I show, I prefer to make the skeleton or supporting structure 101 of relatively thin strip metal formed and secured to the sole plate in such a manner that the band 103 will be stressed and thereby provide a relatively rigid housing supporting structure. A material of high thermal reluctance, as for instance, stainless steel, may be used for this structure.

Referring now to Figs. 7 to 11 inclusive, I have shown a modified form of housing supporting structure of substantially the same construction as the one shown in Fig. 12, the only difference being that the several members are provided with slots 133 so positioned as to increase the thermal reluctance of the members and to assist in dissipating heat from these members. In these figures 121 is the V-shaped supporting band or frame, 123, the front housing support, and 125 the two rear supporting members. On these views I show an optional method of securing members 123 and 125 to the band 121 by rivet members 127 having intermediate portions with a diameter greater than that of the ends. The ends of these members 127 may extend through openings 129 in the V-band and 131 in members 123 and 125 and be headed over. Any heat which reaches the housing from the heated body by conduction must flow through this supporting structure. The V-band may also be utilized to confine the side portions of the heat-insulating material 47 when the same consists of mineral wool.

The upper central portion of either member 123 or member 115, whichever is used, may be secured to the housing 51 as by screws 99 which also hold the members 95 in place. It can be seen from the drawings that the part of the V-bands in contact with the heated body is extremely small in comparison to the open surfaces of these members. It is also apparent that the portions of the members 111 or 123 and 125 or 117 in contact with the V-band is small in comparison to their open surface. Such construction makes it possible to more effectually dissipate the heat conducted to these members. It can also be seen that the path conducted heat must travel from the heated body to the housing is a circuitous one which is considerably longer than the straight line distance between these points. In the modified form of supporting structure shown in Figs. 7 to 11, the exposed surface in comparison to the contact surface of the members is even greater and the distance between the heated body and the housing which conducted heat must travel is effectually longer than in the structure shown in Fig. 12. While I have shown and described in detail one form of supporting structure and a modification thereof, it is, of course, obvious that other means effective for the same purpose may be used.

135 is a motor-driven fan which may be supported in the rear portion of the housing by a bracket 137 (see Fig. 1) and provided with a blade 139. This motor-driven fan may be of any suitable type and construction which will produce the desired air movement. The fan in the embodiment shown is positioned in the rear end of the housing which with the recess in the handle, forms an enlarged chamber therefor. In order to accommodate a different type or construction of fan, it may be necessary to change the position of the fan and to alter the structure of the housing or handle.

The fan may be electrically connected as shown in the diagram of Fig. 15 where it is connected across the line. This would energize the motor and start the fan as soon as the cord is plugged in the electric receptacle. The electric fan assembly as shown is arranged and positioned to move a stream of air both along the upper side and the under side of the iron housing. Openings 141 in the rear of the housing and 143 in the lower part of the handle may be provided as an inlet for cooling air while a grill or louvres 145 provide an opening through which air may be forced above the upper side of the housing.

In my Patent No. 2,186,930, to which I have already referred, air is moved by a fan under the housing to maintain it at a relatively low temperature. I have found, however, that a stream of cooling air which passes over the fingers or in the vicinity of the hand of an operator greatly increases the comfort of the operator. Such a stream of air over the top of the iron housing will also cool the housing, handle, and the thermostat-regulating means. If the fan is arranged to force a stream of air only over the top of the housing, the handle, housing, and other exposed parts will be cooled to such an extent as to make such an iron far superior to the prevailing type. I have found, however, that by positioning the fan to force some air over the housing and some under the housing, even better results may be obtained and this is the embodiment which I have illustrated although both are within the scope of my invention. The former construction would perhaps be less expensive and might, therefore, be desirable under certain conditions.

A bottom closure plate 147 (see Fig. 1) may be secured to the housing 51 as by one or more small machine screws 149.

A shield 151 may be provided over the front end of the heated body to deflect the air stream from direct contact with the sole plate.

Figure 13:
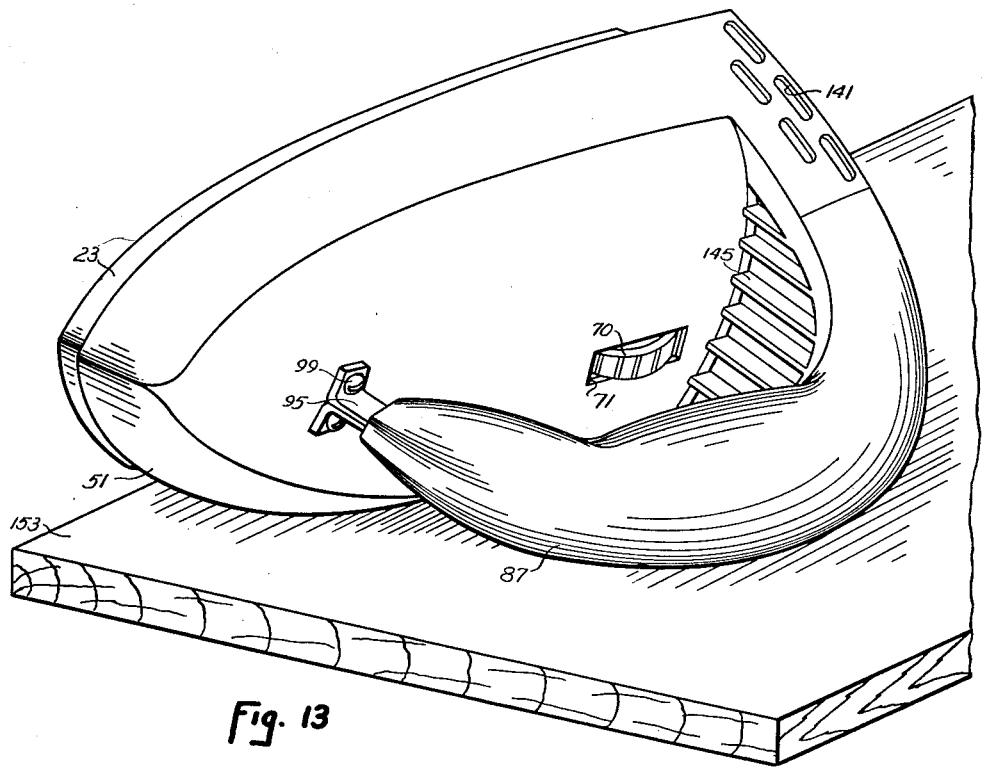
Fig. 13 is a perspective view of one form of iron provided by my invention resting on its side, with the side of the housing and the handle serving as a rest.
Figure 14:
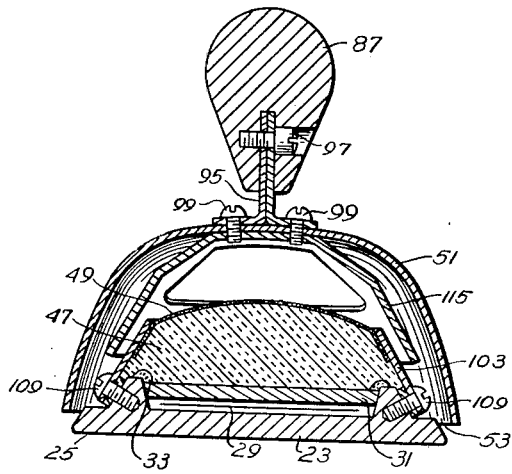
Fig. 14 is a vertical section taken on line 14—14 of Fig. 2.

I have shown in Fig. 13 how the design and operating temperature of the housing make it possible to rest the iron on its side with only the side of the housing and the handle in contact with the supporting surface 153. Since the housing extends down in front of and is spaced from the sides of the sole plate, it effectually keeps the sole plate out of contact with the supporting surface. This result could, of course, be achieved by providing a bump or enlarged portion on the side of the housing. The housing and handle are so cool that the iron can be laid on its side on the garment or cloth being ironed without the danger of scorching or burning it.

The electric fan of the embodiment just described will start as soon as the electric cord is connected with a suitable electric receptacle. At the same time the electric heating element will be energized and current will flow into the heating element until the sole plate reaches the proper operating temperature as determined by the manual setting of the thermostat. As the iron is used heat will be taken from the sole plate and replaced by the thermostatically regulated heating element. Heat will flow from the heating element directly to the sole plate and from the top of the heating element to the clamping plate and thence to the sole plate. The clamping plate, if maintained in good thermal contact with the sole plate as by a welding seam, will conduct a large percentage of the heat reaching it to the sole plate especially while the iron is being used and heat is being conducted away from the sole plate. Heat flow from the top of the clamping or inner plate will be retarded by the heat-insulating means directly over the clamping plate. If the fan is arranged to move air under the housing as well as over the housing, most heat passing through the insulating means will be removed by the air stream passing under the housing.

The housing may be supported from the heated body of the iron by the housing supporting assemblies described and shown. Heat flow through these members may be retarded by constructing them of a material of high thermal reluctance as described and connecting the several members with each other as shown to provide only a very circuitous path for heat travel between the heated body and the housing. The distance along this rather narrow path will be much greater than the straight line distance between the heated body and the housing and consequently the heat flow between these points will be appreciably reduced. In the embodiment having a fan arranged to circulate air under the housing, these members will also be subjected to a stream of cooling air which will still further reduce the conduction of heat to the housing from the heated body. The area of these members in thermal contact with each other and with the heated body is much smaller than their exposed area so that whether or not a fan-driven stream of air is supplied, most of the heat conducted through them will be dissipated by their radiation and they will conduct very little heat to the housing. The lower edge of the housing is shown spaced an appreciable distance from the heated body and direct transfer of heat to the housing may thus be prevented. In the embodiment shown, the handle will receive little conducted heat since its front support is connected with the cool housing while its rear main support is located not only at the rear of the iron but for the greater part behind the heated body. The fan is shown positioned to draw air through the openings 143, move it under the handle, and force it out opening 145. This will further cool the handle support.

The housing of the iron which I have shown extends down in front of and is spaced from the sides of the sole plate. Such construction makes it impossible for the fingers of an operator to come in contact with the sides of the sole plate while the iron is in use and serious burns are thus prevented. If the electric fan is positioned as shown in Fig. 1, it will force a stream of air through the passage formed between the housing and the sole plate and thus maintain the lower part of the housing at a temperature well below that which will cause a burn or discomfort. This feature is especially useful where it is desired to hold or smooth the garment being pressed with the hand and move the iron close to the fingers.

The air forced along above the housing will carry away any heat which does reach the upper side of the housing and will provide a stream of air around the hand to add to the comfort of a user. The air stream above the housing will also cool the handle and thermostatic regulator wheel not only when the iron is in use but when it is in a resting position. It is in this latter position that the handles of the conventional irons become extremely hot.

As has been explained, it is only necessary to lay the iron on its side when it is desired to place it in a position of rest. This is an added feature of convenience.

By way of illustration, I have found that while conventional irons show a temperature of approximately 325° F. on the outside and top of the housing with a sole plate temperature of from 525° F. to 550° F., an iron constructed according to the design shown in Fig. 1 gave a temperature rise of approximately 25° F. above the room temperature with the same sole plate temperature. These tests were all made with a 1,000 watt heating element in my iron. The efficiency of my iron was substantially the same as that of the other irons tested. This is a very appreciable difference in housing temperature especially when it is considered that the many advantages resulting therefrom are not attained by sacrificing efficiency.

Figure 16:
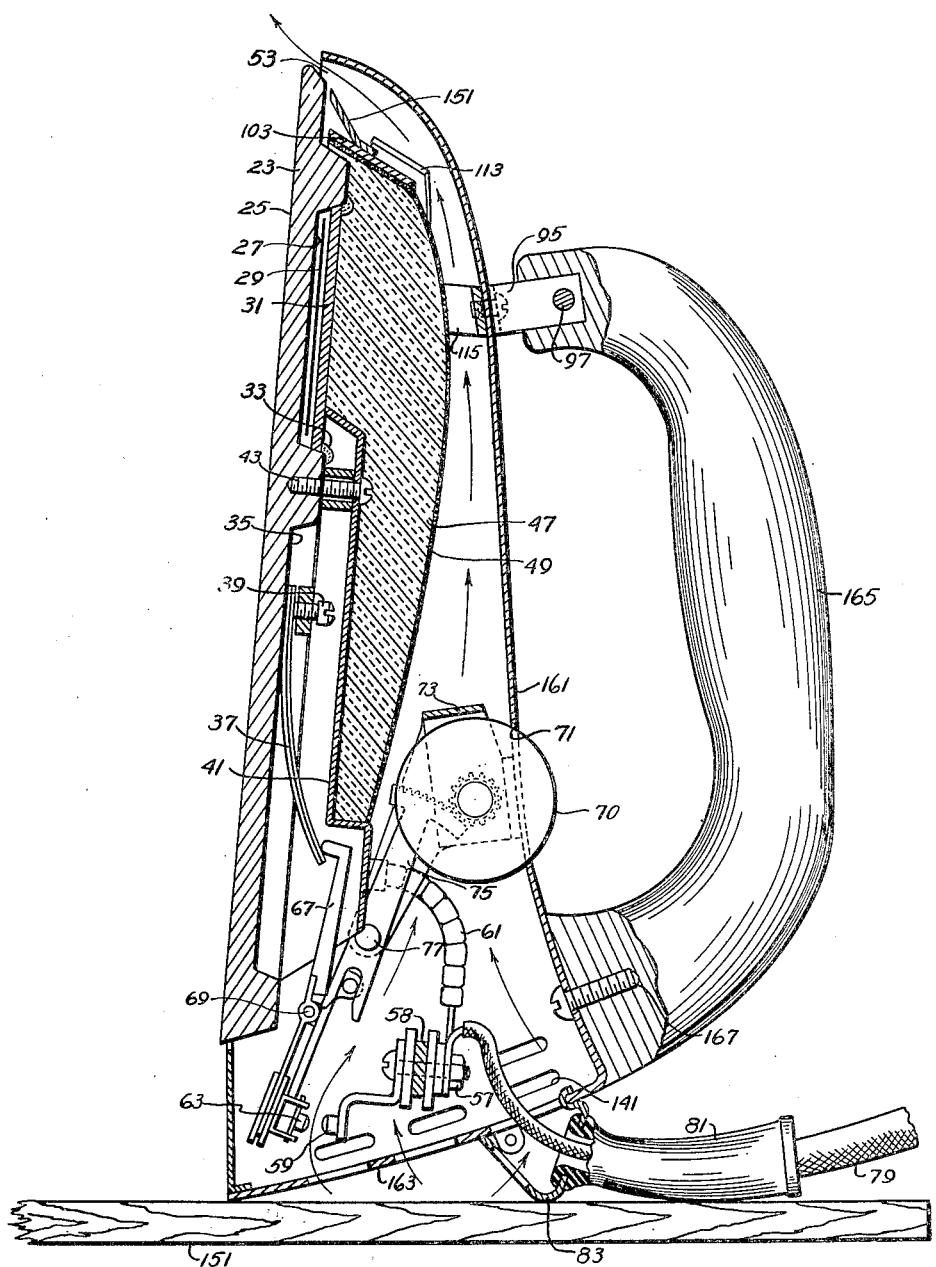
Fig. 16 is a view mainly in longitudinal vertical section of one form of iron embodying my invention but without the electric fan shown in the iron of Fig. 1. In this view the iron is shown with its heel portion used as a rest.

In Fig. 16 I show an iron constructed according to my invention but without the fan shown in the type previously described. The housing 161 of this embodiment is similar to housing 51 except that the rear portion 163 of this housing need not extend back as far as the rear portion of the housing 51. Openings 161 are provided in the rear of this housing as in housing 51 for the inflow of air. Whereas the housing 51 was provided with an open-top rear portion 85 closed by handle 87, this housing may be closed at that point and extends under the handle. The handle 165 need not be recessed as handle 87 and may be secured directly to the top of the housing as by a screw 167. The outer surface of housing 161 may be blackened or made dark in color. This may be done by using any one of the many available processes well known in the art. Black nickel plating will, for instance, provide a permanent black closely adherent coating which will withstand both the wear and heat to which it is subject. I have found that with the conventional bright finish, the temperature on the housing is approximately 12% higher than with the blackened housing. Such a difference in housing temperature is not so important in those irons equipped with a fan as the housing temperature is very low without this expedient but in the fanless type iron a difference of 12% in this temperature is an appreciable factor in making the design practical. It may be desirable in some instances to roughen the outer surface of the housing to still further increase the radiation therefrom or to provide a shiny under side to the housing to reflect heat back to the heated body. The clamping plate, insulation, and supporting members are shown to be the same as previously described and the operation and advantages of this construction as previously set forth apply equally as well here.

The air space between the insulation and housing not only retards the heat flow therebetween but allows circulation of air therethrough to carry away heat from beneath the housing. This space is of marked advantage when the iron is in its resting position as shown in Fig. 16 for it then produces a chimney effect to bring about a large circulation of air. The air flows in through openings 141 through the chamber at the rear of the iron and up between the housing and insulation until it finally leaves the iron through the passage 53 between the housing and sole plate. This circulation is indicated by arrows in Fig. 16. It should also be noted that air will enter through the parts of the passage 53 near the rear of the iron when it is in the resting position since this part of the passage will be lower than the front part of the passage. This circulation together with the other features for reducing heat flow to the housing previously described will reduce the temperature to a point below that which will cause severe burns. By way of example, temperature readings taken after the iron has been resting on its heel as shown in Fig. 16 for a period of several hours indicate a housing temperature of approximately 116° F. with a sole plate temperature of approximately 525° F., while prevailing types of irons under similar conditions had housing temperatures of 525° F. or more with the same sole plate temperatures. These results were obtained with a 1,000 watt heating element in my iron. I thus reduce appreciably the chances of injury to a user and as before, the many advantages resulting from this lower housing temperature are not achieved by sacrificing efficiency.

While I have shown only several particular embodiments of my invention, it will be understood, of course, that the scope of the invention is not to be limited thereby, but is defined by the appended claims.

I claim:

1. An electric iron having a base plate, an electric heating element in heat-conducting relation therewith, a cover over the heating element and base plate, and a fan carried by the iron and arranged to move air along both the upper and under side of the cover.

2. An electric iron having a base plate, an electric heating element in heat-conducting relation therewith, a hollow housing over the heating element and base plate and extending beyond the sides of the base plate and spaced therefrom to form a passageway therebetween and a fan carried by the iron arranged to move air both through said passage and above the upper side of the housing.

3. An electric iron having a base plate, an electric heating element in heat-conducting relation therewith, a hollow housing above the heating element and the base plate provided with a hollow upwardly extending portion, said hollow housing extending beyond the sides of the base plate and spaced therefrom to form a passage between the housing and the base plate, said hollow upwardly extending portion provided with an opening therein, and a fan in the hollow upwardly extending portion of the housing arranged to move air both through the passage and out of the opening along the upper side of the housing.

4. An electric iron having a sole plate, an electric heating element in heat-conducting relation therewith, an inner plate over the heating element in good thermal contact with the sole plate, heat insulation over the inner plate, a housing positioned above and spaced from the heat insulation to form a passageway for air between said heat insulation and said housing, and a fan carried by the iron to move air both above the upper side of the housing and through the said passageway between the housing and the heat insulation, said insulation being arranged to retard flow of heat from said inner plate into said passageway, said fan being operative to move air through said passageway and thereby cool said passageway and retard the heating of said housing.

5. An electric iron having a base plate, a heating element in heat-conducting relation therewith, a housing-supporting frame supported by the base plate, a housing over the heating element and base plate supported by said frame, a fan carried by the iron and arranged to move air along both the upper and under side of the housing, said supporting frame being positioned in the air stream on the under side of the cover.

6. An electric iron having a base plate, a heating element in heat-conducting relation therewith, means to hold the heating element against the base plate, a housing over said means provided with an upwardly extending portion, said portion provided with openings therein, a fan carried by the iron and arranged to move air out of said openings and across the upper side of the housing and to move air along the under side of the housing.

7. An electric iron having a base plate, a heating element in heat-conducting relation therewith, a housing above the heating element and base plate provided with an upwardly extending portion at the rear of the iron, a handle extending forwardly from the upwardly extending portion, said portion provided with openings in the front thereof, a fan carried by the iron and arranged to move air both along the under side of the housing and out of the openings in the front of the upwardly extending portion of the housing.

8. An electric iron having a base plate, a heating element in heat-conducting relation therewith, a housing-supporting frame supported by the base plate and presenting a larger radiating surface than the surface in contact with the base plate, a housing supported by the housing-supporting frame, said housing extending beyond the sides of the base plate and spaced therefrom to provide a passage therebetween, said housing provided with an upwardly extending portion at the rear of the iron, a handle extending forwardly from said upwardly extending portion, openings in the forward part of said upwardly extending portion under the handle and a fan carried by the iron and arranged to move air through the passage between the base plate and the housing and out of the openings in the upwardly extending portion.

9. An electric iron having an electrically heated sole plate, a cover over said sole plate, a fan carried by the iron and arranged to move air along both the upper and under side of the cover, means connecting the cover with the sole plate having a relatively small cross-sectional area for heat transfer between the sole plate and the cover as compared with the heat-dissipating surface of the said means, said means being positioned in the path of the air moved by the fan on the under side of the cover.

10. An electrically heated appliance having a plate to be heated, an electric heating element at one side thereof, a heat-insulating means over the heating element, a hollow housing over the heat-insulating means, heating element, and plate, and an electric fan on said appliance arranged to move air both along the upper side of the housing and between the heat-insulating means and the under side of the housing.

11. An electric iron having a base plate, an electric heating element secured against the top of the base plate, a hollow upper housing above the base plate and means to reduce the heat flow from the heating element to the housing including an electric fan in the hollow housing, an air inlet in the housing adjacent the fan through which air is drawn into the hollow housing and a plurality of air outlets for the exhaust of air from the housing, one of said outlets being located in the housing to direct an exhaust stream of air over the upper side of the housing and another outlet located adjacent the bottom edge of the housing to cause a stream of air to move along under the housing.

12. An electric iron having a base plate, an electric heating element thereon and an inner plate on top of the electric heating element secured in good thermal contact with the base plate, a hollow housing over the base plate spaced from and covering the heating element and inner plate, an upwardly extending portion of said housing located at the rear of the iron, an electric fan in said upwardly extending portion, an air inlet adjacent the fan, an air outlet located in the front of the upwardly extending portion and arranged to direct a stream of air over the housing and another air outlet positioned so that a stream of air to move therefrom must first pass along beneath the housing.

13. An electric iron comprising a heated sole plate, heat-insulating material thereabove, a hollow housing above and spaced from said heat-insulating material, the lower edge of the housing extending down to within a short distance of the plane of the ironing surface of the sole plate and spaced from the edges of the sole plate, housing-supporting means operatively secured to the sole plate providing a circuitous heat flow path of relatively large thermal reluctance between the sole plate and the housing, and a power-driven fan at one end of said iron effective during operation of the iron to move a stream of cooling air longitudinally of the upper side and under side of the top of the housing to provide a relatively cool housing engageable by an operator without injury during normal operation of the iron.

14. An electric iron having a base plate, a heating element in heat-conducting relation therewith, a plate above the heating element secured by a good thermal connection to the base plate, insulating means above said plate, a housing spaced above the insulating means and extending beyond the sides of the base plate and spaced therefrom to form a passage between the housing and the base plate, said housing being provided with an upwardly extending portion at the rear of the iron, a handle extending forwardly from the upwardly extending portion, openings in the front of the upwardly extending portion and a fan carried by the iron arranged to move air both through the passage between the housing and the base plate and out of the openings in the front of the upwardly extending portion, the portion of the housing extending beyond the sides of the base plate being adapted to prevent contact of the fingers with the base plate while the iron is in use.

15. An electric iron having a base plate, an electric heating element in heat-conducting relation therewith, a band secured to the base plate, said band having a larger surface for radiation than that in contact with the base plate, a supporting band secured to and spaced from the first named band, a hollow housing supported by said supporting band, and a fan carried by the iron and arranged to move a stream of air under the housing and over said bands.

16. An electrically heated iron having a base plate, an electric heating element thereon and a metal inner plate holding the heating element against the base plate and secured in good thermal contact with the base plate, heat-insulating means above the inner plate, a band secured to the base plate, an upper band secured to and having its major portion spaced from said band, and a hollow housing above the heat-insulating means supported by and spaced from said upper band.

17. In an electric iron a heated sole plate, a thin metal strip of substantially V-shape plan, disposed above and spaced from said sole plate supported therefrom at a plurality of spaced points, a housing above said sole plate and strip spaced therefrom and extending down in front of the sole plate and means supporting said housing from said strip, said strip and supporting means having a heat flow path of greater length than the direct distance between the sole plate and the housing for heat conducted therebetween.

18. An electric smoothing iron comprising a heated sole plate, a hollow housing thereabove having its lower edge extending below the upper portion of the sole plate and spaced laterally therefrom and means for operatively supporting the housing from the sole plate, said supporting means comprising members having a heat flow path between the sole plate and the housing of relatively high thermal reluctance and an effective length greater than the direct distance therebetween.

19. An electric iron comprising a heated sole plate, a housing above the sole plate, an open frame supported by the sole plate and having a small area in thermal contact therewith at a number of points, said frame supporting said housing and having a small area in thermal contact therewith at a number of points that are laterally spaced from the points at which the frame is attached to the sole plate, thus affording an additional opportunity for heat dissipation.

20. An electric iron having a sole plate, an electric heating element in heat transferring relation with said sole plate, heat-insulating means above said heating element, a housing spaced from the heat-insulating means, a housing-supporting frame extending longitudinally of the iron and supporting the housing and spacing the housing from the heat insulating means, said frame having a major portion thereof spaced from said sole plate and a minor portion thereof of relatively small cross-sectional area through which must pass substantially all heat conducted from the sole plate to the said major portion whereby said frame has a relatively high thermal reluctance, said major portion of said frame being positioned in the space between the insulating means and the housing and constituting a radiating surface.

21. An electric iron having a base plate, a heating element in heat-conducting relation therewith, a cover for the iron above the heating element and base plate extending down in front of and having its lower edge fixedly spaced from the sides of the base plate, a handle, said cover being positioned and constructed to cooperate with the handle of the iron to serve as a rest for the iron when laid on its side, and air moving means carried by the iron to move air between the cover and the base plate and thereby cool the cover.

22. An electric iron having a base plate, an electric heating element in heat-conducting relation therewith, a housing above the heating element and base plate provided with a hollow upwardly extending portion, said upwardly extending portion provided with an opening therein and a fan in the hollow upwardly extending portion arranged to force air out of the opening and across the top surface of the housing.

23. An electric iron having an electrically heated base plate, a housing spaced above the base plate, an electric fan carried by the iron at the rear end thereof, a handle extending forwardly from the top of the fan, said fan being arranged to move a stream of cooling air longitudinally of the iron along the top surface of the housing.

24. In a flatiron having a body portion, a sole plate, and a handle, a heel rest extension projecting rearwardly from the body beyond the sole plate, and a fan unit supported on said extension with said extension projecting rearwardly beyond the fan unit.

25. An electric iron having an electrically heated base plate, a housing spaced above the base plate, an electric fan carried by the iron at an end thereof, a handle extending longitudinally from the top of the fan, said fan being arranged to move a stream of air longitudinally of the iron along the top surface of the housing.

26. An electric iron having a base plate, an electric heating element in heat transferring relation with said base plate, a cover that is positioned above said base plate, said cover having a portion thereof extending outwardly beyond the periphery of said base plate and extending downwardly toward the plane of said base plate, said outwardly extending portion of said cover having a lower edge which is fixedly spaced horizontally from the periphery of said base plate and which is fixedly spaced above the plane of the ironing surface of said base plate, said spacings being dimensioned to prevent contact of the fingers of an operator with said base plate when the iron is resting on said base plate, and an electric fan that is carried by said iron and is positioned to move a stream of air over said cover.

27. In an electric iron, a base plate, an electric heating element in heat transferring relation with said base plate, a housing positioned above and spaced from said base plate, a portion of said housing extending outwardly beyond the entire periphery of said base plate, said portion extending downwardly toward the plane of the smoothing surface of said base plate and terminating in an edge that is spaced above said plane, said edge being spaced above said plane a distance that will prevent the fingers of an operator from contacting the periphery of said base plate when said iron is resting on said base plate, said edge being spaced laterally from said periphery of said base plate to form an air gap therebetween, and a handle, the outwardly extending portion of said housing extending beyond any surface formed by straight lines simultaneously tangent to the periphery of the handle and the periphery of the base plate whereby resting of the iron on a substantially plane supporting surface in any position other than ironing position will raise said base plate out of contact with said supporting surface.

28. An electric iron having a base plate, an electric heating element in heat transferring relation to said base plate, heat insulating material over the heating element, a housing and means interposed between said base plate and said housing, said means securing said housing to said base plate and spacing said housing from said heat insulating material to form an air space between said heat insulating material and said housing, said means having a large portion thereof positioned in said air space, said means providing a circuitous path for the flow of conducted heat between said base plate and said housing, said housing being spaced from said base plate to permit air to move into and out of said air space whenever said iron is resting in a position other than ironing position, said iron being arranged so said air flowing into or out of said air space must pass over said securing means and between said heat insulating material and said housing.

29. An electric iron having a base plate, a heating element in heat-conducting relation therewith, a housing over the base plate and the heating element that is provided with an upwardly extending portion, said portion being provided with an opening adjacent the front thereof to permit the flow of air therethrough, and a fan that is positioned in said portion and is arranged to move air longitudinally over the top of the housing.

30. An electric iron having a base plate, an electric heating element in heat-conducting relation therewith, a thermally responsive switch, means to connect said thermally responsive switch and said heating element whereby energization of said heating element is controlled by actuation of said thermally responsive switch, a cover over said heating element and base plate, and a fan carried by the iron and arranged to move air along both the upper and under side of the cover, said fan being arranged to operate independently of the energization of said heating element.

31. An electric iron having a base plate, a heating element in heat-conducting relation with said base plate, a housing, a rotary fan mounted on and carried by said iron, said fan having its rotary axis extending substantially longitudinally of said iron and being oblique to the plane of said base plate, said fan being positioned to move air over the outer surface of said housing and direct air downwardly toward said plane of said base plate.

32. In an electric iron, a base plate, an electric heating element in heat transferring relation with said base plate, an electric motor, an air moving member secured to and operated by said motor, said motor and said air moving member being positioned adjacent the rear of said iron, and a heel rest projecting rearwardly beyond the rearmost portions of said motor and of said air moving member to hold said air moving member out of contact with a supporting surface on which the iron may be rested and permit said air moving member to be operated by said motor and cause a movement of air when said iron is rested on said heel rest.

33. An electric iron comprising a base plate, an electric heating element in heat-transferring relation with said base plate, an electric motor, an air moving member secured to and operated by said motor, and means of relatively high thermal reluctance interposed between said base plate and said motor, said means providing a heat flow path which has a large radiating surface relative to its cross sectional area to retard flow of heat from said base plate to said motor, said means being arranged to space said motor away from said base plate whereby substantially all of said motor is positioned longitudinally beyond the periphery of said base plate.

34. An electric smoothing iron having a base plate, a heating element in heat-conducting relation therewith, a housing over the heating element, a portion of said housing extending beyond the periphery of the base plate and spaced therefrom to form an air passage therebetween, said portion of said housing extending downwardly toward and spaced above the plane of the smoothing surface of the base plate, and a fan carried by the iron and arranged to move air through said passage, said portion of the housing, that extends beyond the base plate being spaced above the plane of the smoothing surface of the base plate and away from the base plate distances that are dimensioned to prevent contact of an operator's fingers with the periphery of the base plate when the iron is resting on the base plate.

35. An electric smoothing iron having a sole plate, an electric heating element in heat conducting relation with said sole plate, a guard extending beyond the periphery of the sole plate and spaced therefrom to form an air passage between the guard and the sole plate, said guard extending downwardly toward the plane of the smoothing surface of the sole plate and terminating in an edge that is spaced above the plane of the smoothing surface of the sole plate, a fan carried by the iron and arranged to move air through said passage and to move said air outwardly from said passage and under the said edge of the guard.

36. An electric iron, wherein the major portion of the surface thereof is cool operating, having a base plate, an electric heating element in heat conducting relation with said base plate, a housing, means secured to said base plate and said housing to position said housing in spaced relation with said base plate, said means being of high thermal reluctance to retard heat conduction from said base plate to said housing and thereby retard heating of said housing, said housing having the outer surface thereof dark in color to increase heat radiation therefrom and thereby limit heating of said housing.

FRANK W. SCHARF.